June 12, 1951  J. G. ZIEGLER  2,556,955
TEMPERATURE CONTROL SYSTEM
Filed Jan. 30, 1947
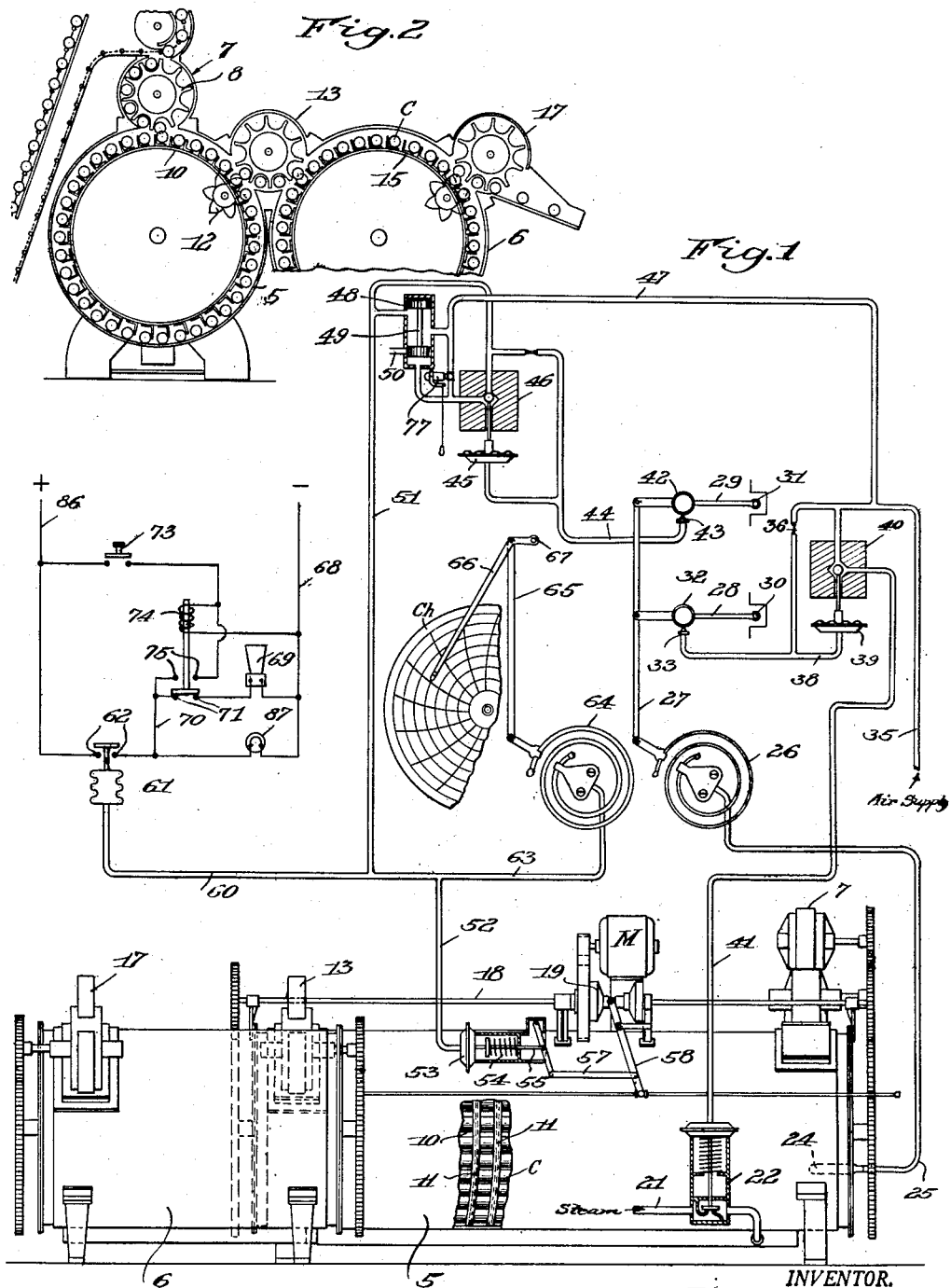
INVENTOR.
John G. Ziegler
BY D. Clyde Jones
his Attorney Patented June 12, 1951

2,556,955

UNITED STATES PATENT OFFICE 2,556,955

TEMPERATURE CONTROL SYSTEM

John G. Ziegler, Walnut Creek, Calif., assignor to Taylor Instrument Companies, Rochester, N. Y., a corporation of New York Application January 30, 1947, Serial No. 725,309

6 Claims. (Cl. 99—334)

This invention relates to a temperature control system for the safe processing of food products and the like.

In the canning of certain food products extreme care must be exercised in effecting the proper sterilization thereof or else the consumer will be subjected to the hazard of food poisoning.

Where canned foods are processed in a cooker of the continuous type, it is highly essential that infallible means be provided to segregate the unsterilized containers from those that are properly sterilized.

In accordance with the main feature of the present invention there is provided a saftey control system for a continuous type cooker in which the progress of the food containers through the cooker is stopped if the temperature therein becomes subnormal and in which signals are simultaneously given to an inspector and a permanent graphic record is also made of the time and duration of the stoppage.

Other features and advantages of the invention will appear from the detailed description and claims when taken with the drawings in which:

Fig. 1 diagrammatically illustrates the complete system; and Fig. 2 is a diagrammatic showing of the travel of the cans through the feed valve into the cooker as well as the transfer from the cooker to the cooler and the discharge from the cooler.

In the drawing, there is indicated a continuous pressure cooker 5 and a cooler 6 preferably an A-B continuous pressure cooker and cooler of the type manufactured by the Food Machinery Corporation. In such a combined cooker and cooler the cans or containers C to be processed are introduced into the pressure cooker 5 in a continuous series, through a valve 7 comprising a driven rotor 8 having a plurality of pockets one for each can. The rotor is so constructed that it makes a sealed wiping fit with the adjacent wall of the cooker, thereby effectively sealing each pocket from adjacent pockets. The rotor delivers the cans in succession into a constantly rotating reel 10. This reel is provided with a stationary spiral track 11 along which the series of cans C are advanced through the cooker. A suitable ejector 12 ejects the cans, one at a time, from the reel into the rotor of a valve 13 similar in construction to the valve 7. Valve 13 in turn introduces the cans in succession into the cooler 6 wherein they are advanced to the cooler outlet by a constantly rotating reel 15 along a second stationary spiral track 16 (not shown). At the outlet end of the cooler an ejector (not shown) transfers the cans, one at a time, to the rotor of valve 17 for discharge to the atmosphere.

The reels of both the cooker and cooler, as well as the valves 7, 13 and 17, are driven in synchronism by means including shaft 18 through clutch mechanism 19 (shown engaged), from a suitable source of power, such as motor M.

The temperature within the cooker 5 is normally maintained at a predetermined value by the introduction therein of steam supplied through pipe 21 depending on the adjustment of the motor diaphragm valve 22. Valve 22 is automatically adjusted by a temperature controller. This controller includes a tube system filled with thermosensitive fluid and consisting of a bulb 24 which communicates through the capillary tube 25, with the interior of the Bourdon spring 26. The inner end of the Bourdon spring is fixed while its outer end is free to move as the spring unwinds in response to an increase in temperature at bulb 24 or winds up in response to a decrease in temperature thereat. The free end of the Bourdon spring is connected by a link 27 to the movable ends of the baffle levers 28 and 29 which are pivoted at 30 and 31 respectively on fixed supports. The baffle lever 28 carries a baffle 32 to cooperate with a nozzle 33. Compressed air or other fluid under pressure is supplied from pipe 35 through orifice 36 where it escapes through nozzle 33 under the control of baffle 32.

Let it be assumed that the temperature at bulb 24 increases. The thermosensitive medium in the tube system then expands causing the Bourdon spring 26 to unwind which raises link 27 to move the free ends of the baffle levers 28 and 29 upward. As the baffle lever 28 swings upward, it permits more air to escape from the nozzle 33 to cause a drop in the back pressure thereat. This drop in back pressure is communicated through pipe 38, to the capsular chamber 39 of relay valve 40, for opening this valve. As the relay valve opens, it increases the pressure of the air supplied to pipe 41 and the diaphragm motor of valve 22 to close this valve and thereby reduce the amount of steam introduced into the cooker. A drop in temperature at bulb 24, causes the temperature control mechanism to operate in the same manner but in the reverse sense.

If the nozzle 33 were placed above the baffle 32, the pressure in diaphragm 39 would decrease as the temperature of the bulb 24 is increased. Furthermore, the output pressure of the relay 40 would increase and it would be necessary to use a valve at 22 which opens with an increase in pressure. While the temperature in the cooker is above the required processing value, the Bourdon spring 26 operating through link 27 holds the free end of baffle lever 29 and the baffle 42 thereon away from the nozzle 43 so that the pressure in pipe 44 is at a minimum value. Therefore, the capsular chamber 45 is collapsed and valve 46 is open. With valve 46 open, the piston 49 of three-way valve 48 is up and air from the supply lines 35 and 47 can pass through valve 48 to the valve 46 and thus to the bottom of valve 48 in one direction and to pipe 51 in the other direction. Pipe 51 communicates through branch pipe 52, to the diaphragm chamber of a pneumatic motor 53, which acts against the restoring spring 54, holding the stem 55 to the right. This stem through the linkage 57 holds the clutch lever 58 in the right hand position wherein the clutch mechanism 19 is engaged. Pipe 51 also communicates through branch pipe 60 to the bellows 61 of the electropneumatic switch 62 to hold open this switch and thereby hold inoperative the alarm mechanism, to be described. The pipe 51 also communicates through branch pipe 63 with Bourdon spring 64, which unwinds and through link 65 holds frequency pen arm 66, which is pivoted at 67, in its outer position on chart Ch. It will be understood that the chart is clock driven during the operation of the system.

In the event that the temperature within the cooker drops a predetermined number of degrees below the required value, the Bourdon spring 26 will tend to wind up. As this spring winds up, the link 27 moves the free end of baffle lever 29 downward to decrease the gap between the baffle 42 and the nozzle 43 thus increasing the pressure in the pipe 44 and in capsular chamber 45. This increase in the pressure in capsular chamber 45 closes the valve 46 and decreases the pressure below the piston 49 in valve 48 causing it to move downward. As piston 49 moves downward, it cuts off the supply of air from line 48 and exhausts the air remaining in the system through port 50. Thus the pressure in the pipe 51 and its branches 52, 60 and 63, exhausts to the atmosphere. This causes the pneumatic motor 53 to deflate and thereby to shift the clutch lever 58 to its declutching position. In this position, the motor M is disconnected from the drive shaft so that the reels in the cooker and in the cooler are immediately stopped. When compressed air is exhausted from branch pipe 60, the bellows 61 deflates to close the switch contacts 62. On the closing of these contacts, electric current is supplied from one side of the source, over conductor 86, contacts 62, lamp 87, conductor 68 to the other side of the current source. Lamp 87 lights to give a visual signal of the abnormal condition in the cooker. At the same time, an audible signal is given by the horn 69, which is operated in a circuit including conductor 86, contacts 62, conductor 70, contacts 71, horn 69 and conductor 68. While the lamp 87 remains lighted until the reel 10 is started again, an attendant can stop the horn 69 by depressing the key 73. This completes an obvious circuit for operating the relay 74 which opens its back contacts 71 to interrupt the actuating circuit for the horn 69. Relay 74 closes its contacts 75 and thereby completes a locking circuit for itself from conductor 68, winding of relay 74, its closed contacts 75, conductor 70, switch contacts 62, to conductor 86.

When the air is exhausted from pipe 63, Bourdon spring 64 winds up and through link 65, swings the pen arm 66 a short distance counterclockwise toward the center of the chart Ch and thereby causes a jog in the graph which the pen is drawing on this chart. It will be recalled that the chart is driven by a clock motor so that the graph drawn on the chart, will afford a permanent record of the time of occurrence as well as the duration of abnormal conditions within the cooker.

Since the air supply to the valves 48 and 46 and to the nozzle 44 has been cut off, the pressure can not be reestablished in the system to operate the pneumatic motor 53 and shift the clutch to starting position even though the proper temperature has been reestablished by the action of controller through the valve 22. Therefore, the cooker reel remains stationary until started manually by the momentary opening of the whistle valve 77. Supply line 47 increases the pressure below piston 49 in relay 48 thus opening it so that air can pass from supply line 47 through valve 48 to the valve 46 and to the nozzle 43. Since the baffle 42 has been raised away from the nozzle 43 by the reestablishing of the proper temperature, the air in the line 44 and in capsular chamber 45 is exhausted and the pressure is again at a minimum. When the piston 49 in valve 48 is again raised, the pressure is reapplied to pipe 51. With compressed air in this pipe the pneumatic motor of the clutch is operated to connect the driving motor M to the reel 10 and the bellows of the electropneumatic switch 62 is inflated to open its contacts. Also with compressed air in pipe 51, the Bourdon spring 64 unwinds to swing the frequency pen 66 clockwise toward the outside of the chart to record the fact that the reel 10 is operating.

What I claim is:

1. In a food processing system, a cooker comprising means including a reel continuously advancing a series of containers through the cooker when driven, reel driving means, a clutch arranged to couple the reel to said driving means and to uncouple the reel from said driving means, a pneumatic motor serving to operate said clutch, a source of compressed air, and thermosensitive mechanism actuated by temperature conditions within said cooker, said mechanism including means operative in response to one temperature condition within said cooker controlling the application of compressed air from said source to said clutch motor and operative in response to a different temperature condition within said cooker for disconnecting compressed air from said clutch motor.

2. In a food processing system, a cooker comprising means including a reel continuously advancing a series of containers through the cooker when driven, reel driving means, a clutch arranged to couple the reel to said driving means and to uncouple the reel from said driving means, a pneumatic motor serving to operate said clutch, a source of compressed air, a source of heating medium, thermosensitive mechanism actuated by temperature conditions within said cooker, means actuated by said mechanism and controlling the admission of said heating medium to said cooker in amounts to substantially maintain a predetermined temperature therein, and means controlled by said mechanism and operative in response to one temperature condition within said cooker controlling the application of compressed air from said source to said clutch motor and operative in response to a different temperature condition within said cooker for disconnecting compressed air from said clutch motor.

3. In a food processing system, a cooker comprising means including a reel continuously advancing a series of containers through the cooker when driven, reel driving means, a clutch arranged to couple the reel to said driving means and to uncouple the reel from said driving means, a pneumatic motor serving to operate said clutch, a source of compressed air, a signal indicating an abnormal temperature condition in said cooker, means including a pneumatic motor for operating said signal, and thermosensitive mechanism actuated by temperature conditions within said cooker, said mechanism including means operative in response to one temperature condition within said cooker controlling the application of compressed air from said source to the motors of said clutch as well as said signal and operative in response to a different temperature condition within said cooker for disconnecting said source of compressed air from said motors.

4. In a food processing system, a cooker comprising means including a reel continuously advancing a series of containers through the cooker when driven, reel driving means, a clutch arranged to couple the reel to said driving means and to uncouple the reel from said driving means, a pneumatic motor serving to operate said clutch, a source of compressed air, a chart advanced in accordance with time, a frequency pen arranged to make a record on said chart, a pneumatic motor serving to operate said pen, and thermosensitive mechanism actuated by temperature conditions within said cooker, said mechanism including means operative in response to one temperature condition within said cooker controlling the application of compressed air from said source to the motors of said clutch as well as said pen and operative in response to a different temperature condition within said cooker for disconnecting said source of compressed air from said motors.

5. In a food processing system, a cooker comprising means including a reel continuously advancing a series of containers through the cooker when driven, reel driving means, a clutch arranged to couple the reel to said driving means and to uncouple the reel from said driving means, a pneumatic motor serving to operate said clutch, a source of compressed air, a signal indicating an abnormal temperature condition in said cooker, means including a pneumatic motor for operating said signal, a chart advanced in accordance with time, a frequency pen arranged to make a record on said chart, a pneumatic motor serving to operate said pen, and thermosensitive mechanism actuated by temperature conditions within said cooker, said mechanism including means operative in response to one temperature condition within said cooker controlling the application of compressed air from said source to the motors of said signal, said clutch as well as said pen and operative in response to a different temperature condition within said cooker for disconnecting said source of compressed air from said motors.

6. In a food processing system, a cooker comprising means including a reel continuously advancing a series of containers through the cooker when driven, reel driving means, a clutch arranged to couple the reel to said driving means and to uncouple the reel from said driving means, a pneumatic motor serving to operate said clutch, a source of compressed air, a chart advanced in accordance with time, thermosensitive mechanism actuated by temperature conditions within said cooker, said mechanism including means operative in response to one temperature condition within said cooker controlling the application of compressed air from said source to the motor of said clutch and operative in response to a different temperature condition within said cooker for disconnecting said source of compressed air from said motor, and manual means including at least a part of said mechanism for reapplying compressed air to said motor.

JOHN G. ZIEGLER.

REFERENCES CITED

The following references are of record in the file of this patent:

UNITED STATES PATENTS

| Number    | Name     | Date           |
|-----------|----------|----------------|
| 998,499   | Gordon   | July 18, 1911  |
| 1,161,376 | Bristol  | Nov. 23, 1915  |
| 1,836,641 | Brett    | Dec. 15, 1931  |
| 2,103,324 | Down     | Dec. 28, 1937  |
| 2,158,250 | Peters   | May 16, 1939   |
| 2,161,847 | Blodgett | June 13, 1939  |
| 2,392,197 | Smith    | Jan. 1, 1946   |